(12) United States Patent
Zhong et al.

(10) Patent No.: US 12,151,580 B1
(45) Date of Patent: Nov. 26, 2024

(54) ENERGY MANAGEMENT FRAMEWORK AND METHOD FOR RAIL TRANSIT ENERGY STORAGE

(71) Applicants: BEIJING JIAOTONG UNIVERSITY, Beijing (CN); BEIJING BEIJIAO BENYOU TECHNOLOGY CO., LTD., Beijing (CN)

(72) Inventors: Zhihong Zhong, Beijing (CN); Zhongping Yang, Beijing (CN); Fei Lin, Beijing (CN); Hu Sun, Beijing (CN); Xiaochun Fang, Beijing (CN)

(73) Assignees: BEIJING JIAOTONG UNIVERSITY (CN); BEIJING BEIJIAO BENYOU TECHNOLOGY CO., LTD. (CN)

( * ) Notice: Subject to any disclaimer, the term of this patent is extended or adjusted under 35 U.S.C. 154(b) by 0 days.

(21) Appl. No.: 18/743,163

(22) Filed: Jun. 14, 2024

(30) Foreign Application Priority Data

Sep. 26, 2023 (CN) .......................... 202311243029.8

(51) Int. Cl.
*H02J 7/00* (2006.01)
*B60L 53/62* (2019.01)
*B60L 58/12* (2019.01)

(52) U.S. Cl.
CPC .............. *B60L 53/62* (2019.02); *B60L 58/12* (2019.02); *B60L 2200/26* (2013.01); *B60L 2260/46* (2013.01)

(58) Field of Classification Search
None
See application file for complete search history.

(56) References Cited

U.S. PATENT DOCUMENTS

| | | | |
|---|---|---|---|
| 10,042,359 B1 * | 8/2018 | Konrardy | B60W 40/04 |
| 11,273,724 B1 * | 3/2022 | Palombini | B64F 1/32 |
| 2021/0291803 A1 * | 9/2021 | Gesang | B60W 10/08 |
| 2022/0285971 A1 * | 9/2022 | Gannamaneni | B60L 53/57 |
| 2022/0289067 A1 * | 9/2022 | Adegbohun | H01M 10/6554 |
| 2022/0412023 A1 * | 12/2022 | Palombini | B64F 1/36 |
| 2023/0306801 A1 * | 9/2023 | Beaurepaire | G01C 21/3469 |

FOREIGN PATENT DOCUMENTS

| | | |
|---|---|---|
| CN | 201711053352 A | 4/2018 |
| CN | 201811509514 | 4/2019 |
| CN | 2022113308852 A | 3/2023 |
| CN | 202211136601 A | 4/2023 |

* cited by examiner

*Primary Examiner* — Arun C Williams

(57) ABSTRACT

The invention relates to an energy management framework and method for rail transit energy storage, which relates to the energy management field of rail transit energy storage. The energy management framework comprises central-level controller, several station-level controllers, and several device-level controllers; among them, the central-level controller is wirelessly connected to all station-level controllers; a station-level controller is connected to a device-level controller by wired communication. The invention realizes the energy management of rail transit energy storage based on the above three-level energy management framework (center level, station level and device level structure).

7 Claims, 10 Drawing Sheets

ENERGY MANAGEMENT FRAMEWORK AND METHOD FOR RAIL TRANSIT ENERGY STORAGE

TECHNICAL FIELD

The invention relates to the energy management field of rail transit energy storage, in particular to an energy management framework and method for rail transit energy storage.

BACKGROUND ART

With the widespread application of energy storage devices such as super capacitors and batteries in urban rail transit, how to use the available information resources to maximize the utilization of train regenerative braking energy is an urgent problem to be solved.

At present, most studies only consider energy storage of single station, for example, in the energy management method for urban rail transit energy storage system based on reinforcement learning with a patent number of CN201711053352.3, it optimizes the super capacitor energy storage device by using reinforcement learning, so as to obtain the optimal energy management strategy in theory. However, there are still the following problems: (1) poor generalization ability; (2) too much obtained information, some of which is difficult to obtain in practice; (3) without considering the difficulty of hardware implementation, the algorithm is difficult to implement on edge devices.

In order to solve the problem of poor generalization ability, the control method, model, equipment and storage medium of rail transit energy storage system with a patent number of CN2022113308852 introduce rule mining and expert system into reinforcement learning, which improves the generalization ability of the algorithm, but there are still other two problems.

The control method, device, equipment and storage medium of super capacitor energy storage device with a patent number of CN2022111366016 introduce an energy management method for single energy storage based on time scale, which reduces the input information and has good generalization ability. However, different time scales are running on the same level of equipment, and there is no clear framework design, which is difficult to apply in practical applications.

For the system with multiple stations equipped with energy storage devices, the distributed coordinated control optimization method for super capacitor energy storage system of urban rail transit ground with a patent number of CN201811509514.4 combines the idea of cooperative game with reinforcement learning, and it proposes a coordinated control strategy for multiple super capacitors, which is divided into two-layer framework, that is, the local energy management unit and central energy management unit, but it does not clearly divide the two-layer framework functionally, but simply optimizes with the same optimization goal, and it does not explain the fusion strategy of the output decision variables of the two-layer framework. In addition, the algorithm of the local energy management unit of the patent still requires too much information and is difficult to actually operate on edge devices.

In summary, the current energy management methods have the following problems that need to be solved urgently: (1) an optimization algorithm that does not rely on real-time information of the train is lacked; (2) a clear and feasible energy management framework with strong versatility is lacked; (3) a multi-energy storage energy management method based on multi-layer framework is lacked.

SUMMARY

The purpose of the invention is to provide an energy management framework and method for rail transit energy storage.

To achieve the above purpose, the invention provides the following scheme:

an energy management framework for rail transit energy storage is proposed, the energy management framework comprises: a central-level controller, several station-level controllers, and several device-level controllers;

wherein the central-level controller is wirelessly connected to all the station-level controllers to collect central-level parameters, and electrical parameter central-level instruction values of all energy storage devices of energy storage systems at next moment are determined according to the central-level parameters. The central-level parameters comprise 10 kV voltages of all substations, voltages and currents of all substation output ends at the current time, an offline train timetable, SOC, currents and voltages of all the energy storage devices at the current time, and electrical parameter station-level instruction values of each energy storage device output by the station-level controller at the previous time; the electrical parameters are voltage, power or current;

the station-level controller is connected with the device-level controller by wired communication; the station-level controller is used to collect the station-level parameters, and according to the station-level parameters, electrical parameter initial instruction values of each energy storage device at the next moment are calculated, according to the initial instruction values and the electrical parameter central-level instruction values of each energy storage device at the next moment, the electrical parameter station-level instruction values of the energy storage device at the next moment are determined. The station-level parameters comprise the 10 kV voltages of a current substation and adjacent substations; the voltages and currents of the output end of all substations at the current time; the SOC, the current and voltage of the energy storage device of the current substation; the SOC, the currents and voltages of the energy storage device of the adjacent substations; the electrical parameter initial instruction values of each energy storage device and the information of the train at the current time;

the device-level controller is used to collect device-level parameters, and a traction network voltage, a energy storage device current and a energy storage device power are controlled according to the device-level parameters and the station-level instruction values of the electrical parameters, so that the traction network voltage, the energy storage device current and the energy storage device power can reach their respective instruction values; the device-level parameters comprise the traction network voltage, a traction network side current, the energy storage device current and the energy storage device SOC at the current moment.

The invention also provides an energy management method based on the energy management framework; the method comprises:

the central-level controller is used to collect central-level parameters, and electrical parameter central-level instruction values of all energy storage devices of the energy storage systems at next moment are determined according to the central-level parameters; the central-level parameters comprise the 10 kV voltages of all substations, the voltages and currents of all substation output ends at the current time, an offline train timetable, the SOC, the currents and the voltages of all the energy storage devices at the current time, and electrical parameter station-level instruction values of each energy storage device output by the station-level controller at the previous time; the electrical parameters are voltage, power or current;

for each station-level controller, the station-level controller is used to collect the station-level parameters, and according to the station-level parameters, the electrical parameter initial instruction values of each energy storage device at the next moment are calculated, according to the initial instruction values and the electrical parameter central-level instruction values of each energy storage device at the next moment, the electrical parameter station-level instruction values of the energy storage device at the next moment are determined. The station-level parameters comprise the 10 kV voltages of the current substation and adjacent substations; the voltages and currents of the output end of all substations at the current time; the SOC, the current and voltage of the energy storage device of the current substation; the SOC, the currents and voltages of the energy storage device of the adjacent substations; the electrical parameter initial instruction values of each energy storage device and the information of the train at the current time;

the device-level controller is used to collect device-level parameters, the traction network voltage, the energy storage device current and the energy storage device power are controlled according to the device-level parameters and the electrical parameter station-level instruction values, so that the traction network voltage, the energy storage device current and the energy storage device power can reach their respective instruction values; the device-level parameters comprise the traction network voltage, the traction network side current, the energy storage device current and the energy storage device SOC at the current moment.

Optionally, the train information comprises the real-time working condition of the train, the method also comprises:
the ground features of the train in an interval are obtained; the ground features comprise voltages, currents and no-load voltages of substations; the train in the interval is the train between two substations;
The ground features are input into the trained K-means cluster to obtain the real-time working condition of the train in the interval; the working condition comprise traction and braking.

Optionally, the train information comprises the train power, after the real-time working condition of the train in the interval is obtained, the method also comprises:
power identification parameters of the train in the interval are obtained; the power identification parameters comprise the no-load voltage, an output power of the substation, a change rate of the output voltage of the substation, the real-time working condition of the train and the power of the energy storage device;
the power identification parameters are input into a trained power identification model to obtain the train power in the interval; the trained power identification model is a model obtained by taking sample power identification parameters of the train in the interval as input and a sample power of the train in the interval as label.

Optionally, after the real-time working condition of the train in the interval is obtained, it also comprises:
The reference value of the charge and discharge voltage threshold of the energy storage system is determined according to the real-time working condition of the train in the interval and the traction network voltage at the current moment.

When the real-time working condition of the train in the interval is braking, the charge threshold instruction value of the energy storage system is calculated according to the reference value of the charge and discharge voltage threshold and a braking power of the train in the interval.

When the real-time working condition of the train in the interval is traction, the discharge threshold instruction value of the energy storage system is calculated according to the reference value of the charge and discharge voltage threshold and the traction power of the train in the interval.

Optionally, the electrical parameter central-level instruction values of the energy storage devices of all energy storage systems at the next moment are determined according to the central-level parameters, specially comprising:
the central-level parameters are input into a trained instruction prediction model to obtain the electrical parameter central-level instruction values of the energy storage devices of all energy storage systems at the next moment; the trained instruction prediction model is a model obtained by taking the sample center-level parameters as input and the sample electrical parameter center-level instruction values of all energy storage systems as label.

Optionally, the method also comprises:
if the station-level instruction values of the energy storage device collected by the device-level controller are greater than the set threshold, the electrical parameter station-level instruction values of the energy storage device at the previous moment are used to replace the electrical parameter station-level instruction values of the energy storage device.

Optionally, the method also comprises:
if the charge threshold instruction values and the discharge threshold instruction values at the current moment are not within their respective setting ranges, the charge threshold instruction values and the discharge threshold instruction values at the previous moment are used to replace the charge threshold instruction values and the discharge threshold instruction values at the current moment respectively.

Optionally, after the real-time working condition of the train in the interval is obtained, it also comprises:
the typical working condition of the train in the interval of the substation at the current time; the typical operating condition is determined by using an offline operation timetable;
the time difference is calculated according to a time corresponding to a peak power point of the substation in the real-time working condition and the time corresponding to the peak power point of the corresponding train in the offline operation timetable;
The time difference is determined whether it is greater than the set threshold, if so, a departure timetable of the substation will be corrected; if not, the departure timetable of the substation will not be corr.

Optionally, the energy storage device comprises the super capacitor, the battery and a flywheel.

According to the specific embodiments provided by the invention, the invention relates to the following technical effects: the invention provides an energy management framework and method for rail transit energy storage, the energy management framework comprises: the central-level controller, several station-level controllers, and several device-level controllers; among them, the central-level controller is wirelessly connected to all station-level controllers; the station-level controller is connected to the device-level controller by wired communication. The invention realizes the energy management of rail transit energy storage based on the above three-level energy management framework (center-level, station-level and device-level framework).

BRIEF DESCRIPTION OF THE DRAWINGS

In order to more clearly explain the embodiments of the invention or the technical schemes in the existing technology, the following will briefly introduce the drawings needed to be used in the embodiment. Obviously, the drawings in the following description are only some embodiments of the invention, for ordinary technicians in this field, other drawings can be obtained from these drawings without paying creative labor.

DETAILED DESCRIPTION OF THE EMBODIMENTS

The following will be combined with the drawings of the embodiments of the invention to clearly and completely describe the technical scheme of the embodiments of the invention. Obviously, the described embodiments are only part of the embodiments of the invention, not all of the embodiments. Based on the embodiments in the invention, all other embodiments obtained by ordinary technicians in this field without making creative labor belong to the protection scope of the invention.

The purpose of the invention is to provide an energy management framework and method for rail transit energy storage.

In order to make the above purpose, features and advantages of the invention more obvious and easier to understand, the following is a further detailed description of the invention in combination with the attached drawings and specific implementation methods.

Figure 1:
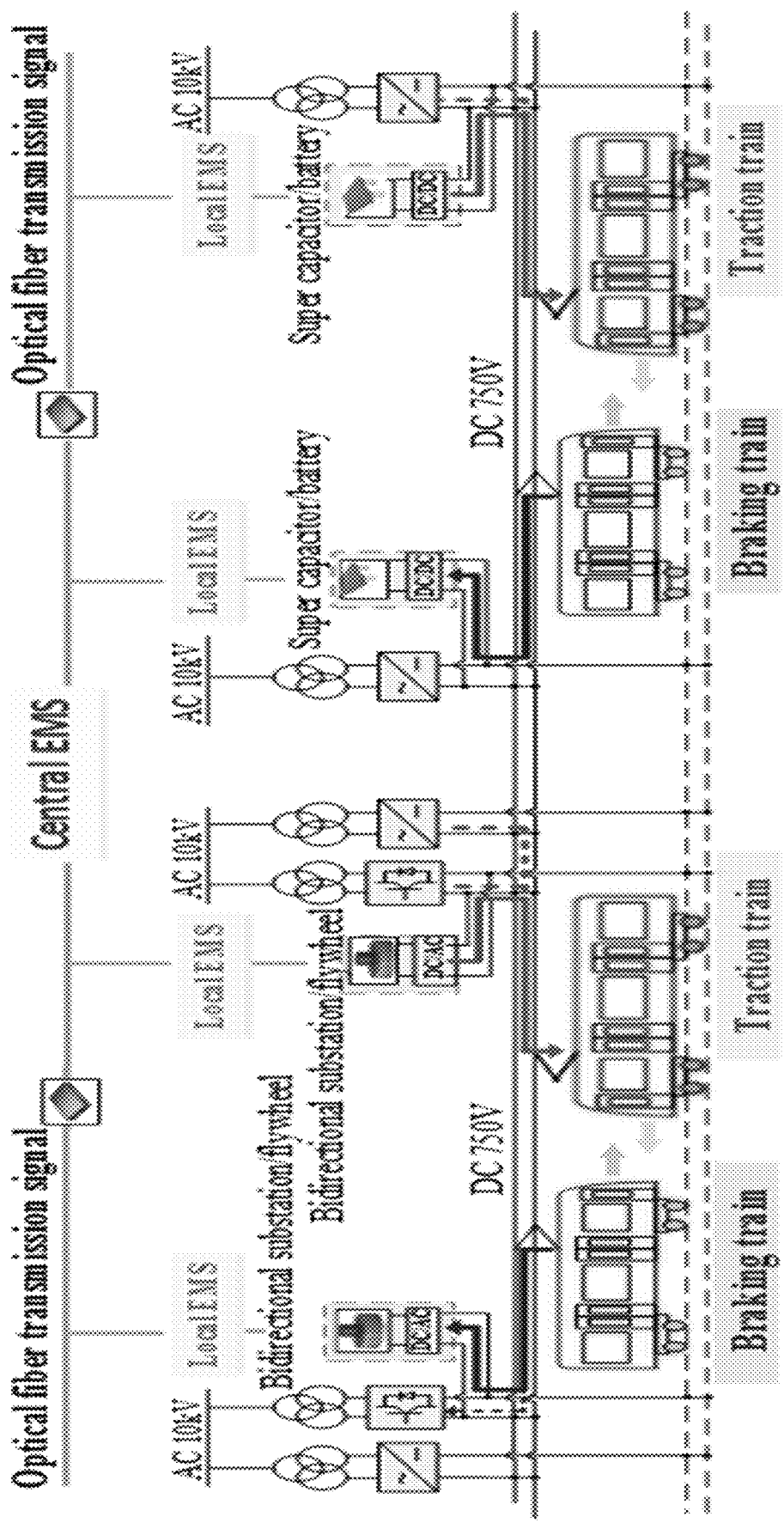
FIG. 1 is the energy management framework provided by the embodiment of the invention.

As shown in FIG. 1, the invention provides an energy management framework for rail transit energy storage, the energy management framework comprises a central controller Central EMS, several station-level controllers DC/AC, and several device-level controllers Local EMS;

Wherein the central-level controller is wirelessly connected to all the station-level controllers to collect central-level parameters, and electrical parameter central-level instruction values of energy storage devices of all energy storage systems at next moment are determined according to the central-level parameters. The central-level parameters comprise 10 k V voltages of all substations, voltages and currents of all substation output ends at the current time, an offline train timetable, SOC, the currents and voltages of all the energy storage devices at the current time, and electrical parameter station-level instruction values of each energy storage device output by the station-level controller at the previous time; the electrical parameters are voltage, power or current;

The station-level controller is connected with the device-level controller by wired communication; the station-level controller is used to collect the station-level parameters, and according to the station-level parameters, electrical parameter initial instruction values of each energy storage device at the next moment are calculated, according to the initial instruction values and the electrical parameter central-level instruction values of each energy storage device at the next moment, the electrical parameter station-level instruction values of the energy storage device at the next moment are determined. The station-level parameters comprise 10 kV voltages of current substation and adjacent substations, the voltages and currents of the output end of all substations at the current time, the SOC, the current and voltage of the energy storage device of the current substation; the SOC, the currents and voltages of the energy storage device of the adjacent substations; the electrical parameter initial instruction values of each energy storage device and the information of the train at the current time;

The device-level controller is used to collect device-level parameters, traction network voltage, energy storage device current and energy storage device power are controlled according to the device-level parameters and the station-level instruction values of the electrical parameters, so that the traction network voltage, the energy storage device current and the energy storage device power can reach their respective instruction values; the device-level parameters comprise the traction network voltage, the traction network side current, the energy storage device current and the energy storage device SOC at the current moment.

The invention also provides an energy management method based on the energy management framework; the method comprises:

the central-level controller is used to collect central-level parameters, and electrical parameter central-level instruction values of energy storage devices of all energy storage system at next moment are determined according to the central-level parameters; the central-level parameters comprise 10 kV voltages of all substations, the voltages and currents of all substation output ends at the current time, the offline train timetable, the SOC, the currents and voltages of all the energy storage devices at the current time, and the electrical parameter station-level instruction values of each energy storage device output by the station-level controller at the previous time; the electrical parameters are voltage, power or current;

for each station-level controller, the station-level controller is used to collect the station-level parameters, and according to the station-level parameters, the electrical parameter initial instruction values of each energy storage device at the next moment are calculated, according to the initial instruction values and the electrical parameter central-level instruction values of each energy storage device at the next moment, the electrical parameter station-level instruction values of the energy storage device at the next moment are determined. The station-level parameters comprise 10 kV voltages of the current substation and adjacent substations; the voltages and currents of the output end of all substations at the current time; the SOC, the current and voltage of the energy storage device of the current substation; the SOC, the currents and voltages of the energy storage device of the adjacent substations; the electrical parameter initial instruction values of each energy storage device and the information of the train at the current time;

the device-level controller is used to collect device-level parameters, the traction network voltage, the energy storage device current and the energy storage device power are controlled according to the device-level parameters and the electrical parameter station-level instruction values, so that the traction network voltage, the energy storage device current and the energy storage device power can reach their respective instruction values; the device-level parameters comprise the traction network voltage, the traction network side current, the energy storage device current and the energy storage device SOC at the current moment.

As shown in FIG. 1, the invention provides an energy management framework, which consists of three layers: device-level (referring to local EMS in the figure), station-level and center-level. These three layers of structure are interrelated and independent of each other, they are not only influenced and restricted by superiors and subordinates, but also have their own operational logic and robustness. Wireless communication transmission is used between the center-level controller and the station-level controller, and wired communication connection is used between the station-level controller and the device-level controller.

The following is a detailed introduction to the functions of the above three-layer structure:

central-level controller real-time acquisition: 1. 10 kV voltages of all substations; 2. the output voltage and output current of substation; 3. energy storage devices SOC (state of charge), currents and voltages of all energy storage systems; 4. offline train timetable; the output instructions of all station-level controllers. In this embodiment, the energy storage device can be a super capacitor, a battery, a flywheel, etc.

Through the algorithm of the central-level controller, the minute-level train power, energy, position prediction and other information are output in real-time and transmitted to the station-level controller as input information. In addition, the voltage instruction values, power instruction values or current instruction values of each energy storage device are output at a time scale slightly larger than the control period, and they are sent to the station-level controller to fuse with the output of the station-level controller.

The central controller is responsible for the management of all energy storage systems, and its hardware equipment is based on a combination of CPU and GPU to improve computational performance and parallel capability.

In this embodiment, the main functions of the central-level controller comprise: long-term full-range prediction of the powers of the all energy storage systems, and hour-level prediction of the slow variables such as the aging parameters of the energy storage system; statistics of long-term energy saving and other indicators, evaluation of the effect of energy storage system; based on the global optimization algorithm, the operating parameters of the energy storage system are optimized and corrected by the central-level controller. The optimization goal of the central controller is to maximize the economic benefits above the hour level while considering the life loss of the energy storage system.

The information that the central controller needs to obtain comprises: 10 kV voltages of all substations, the voltages of substation output ends, the currents of substation output ends, and the SOC, currents, voltages and other state information of all energy storage systems; the offline train timetable, which is used to predict the operation of the train; the output instructions of all station-level controllers, which are used to coordinate the operation strategy of the energy storage system.

The main output of the central controller is the power, energy, position and other predictive information of the train, which are used as the input information of the station-level controller; the voltage threshold, power instruction values or current instruction values of each energy storage device are fused with the output of the station-level controller, and then they are used as the input information of the device-level controller.

The two main functions of the central-level controller are as follows:

1. Real-time correction of timetable based on offline operation timetable and substation power:

after the real-time working condition of the train is obtained in the interval, it also comprises:

the typical working condition of the train in the substation interval at the current time is obtained; the typical operating condition is determined by the offline operation timetable.

The time difference is calculated according to the time corresponding to the peak power point of the substation in the real-time working condition and the time corresponding to the peak power point of the corresponding train in the offline operation timetable.

The time difference is determined whether it is greater than the set threshold, if so, the substation departure timetable will be corrected; if not, the substation departure timetable will not be revised.

Figure 2:
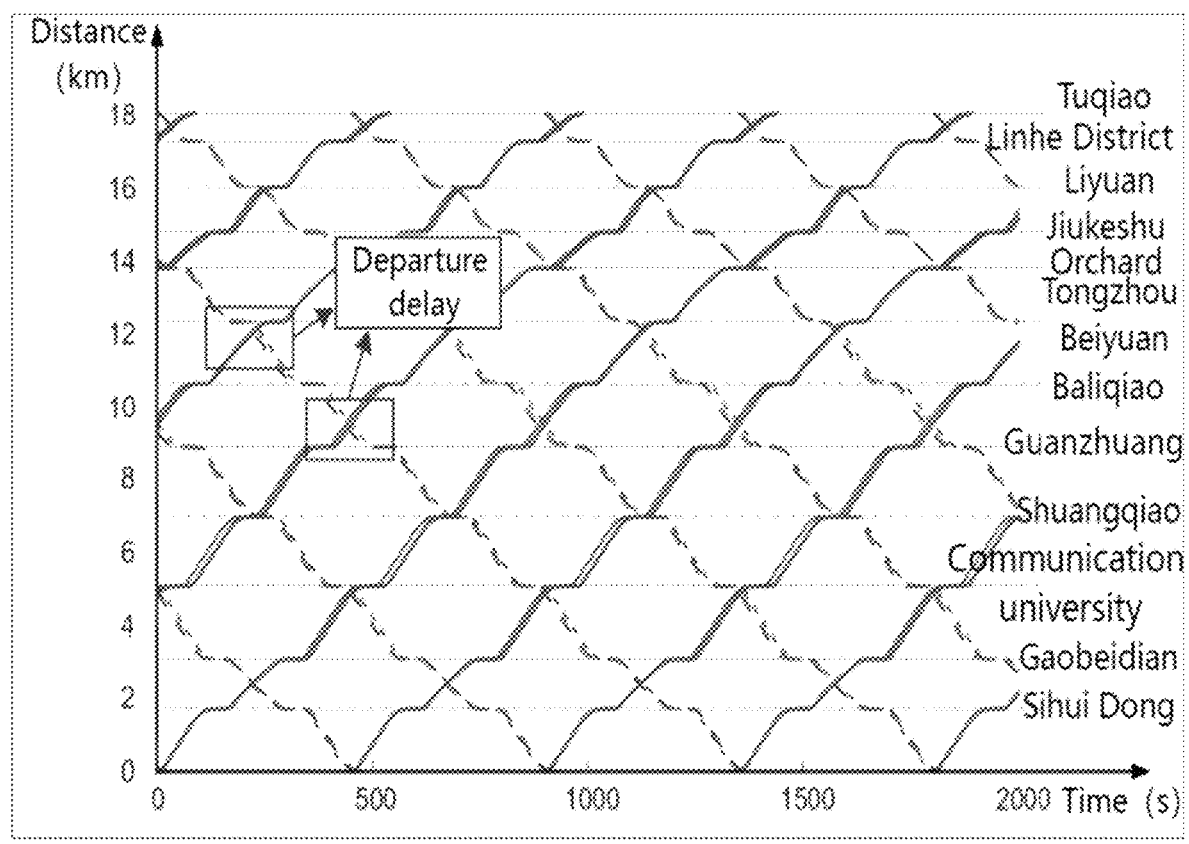
FIG. 2 is the schematic diagram of the running track and running of the train provided by the embodiment of the invention.

Specifically, as shown in FIG. 2, the difference between the train running track and the train running diagram is mainly reflected in the stop time. Because the train is mostly controlled by ATO, the running speed, the acceleration speed and the deceleration speed of the train can be controlled according to the preset curve, so the running track of the train is basically consistent with the train running diagram in the non-stop interval (the interval represents the distance between the two stop stations). In the interval of the stop, due to the uncertainty of the time for passengers to get on and off, the departure time of the train may be delayed, resulting in a deviation between the running track of the train and the train running diagram. In FIG. 2, the thin line of the uplink, the upper one, is the curve before the delay. The thick line, the lower one, is the curve after delay. The long-dotted line of the downlink, the lower one, is the curve before the delay. The short, dotted line, the upper one, is the curve after the delay.

Figure 3:
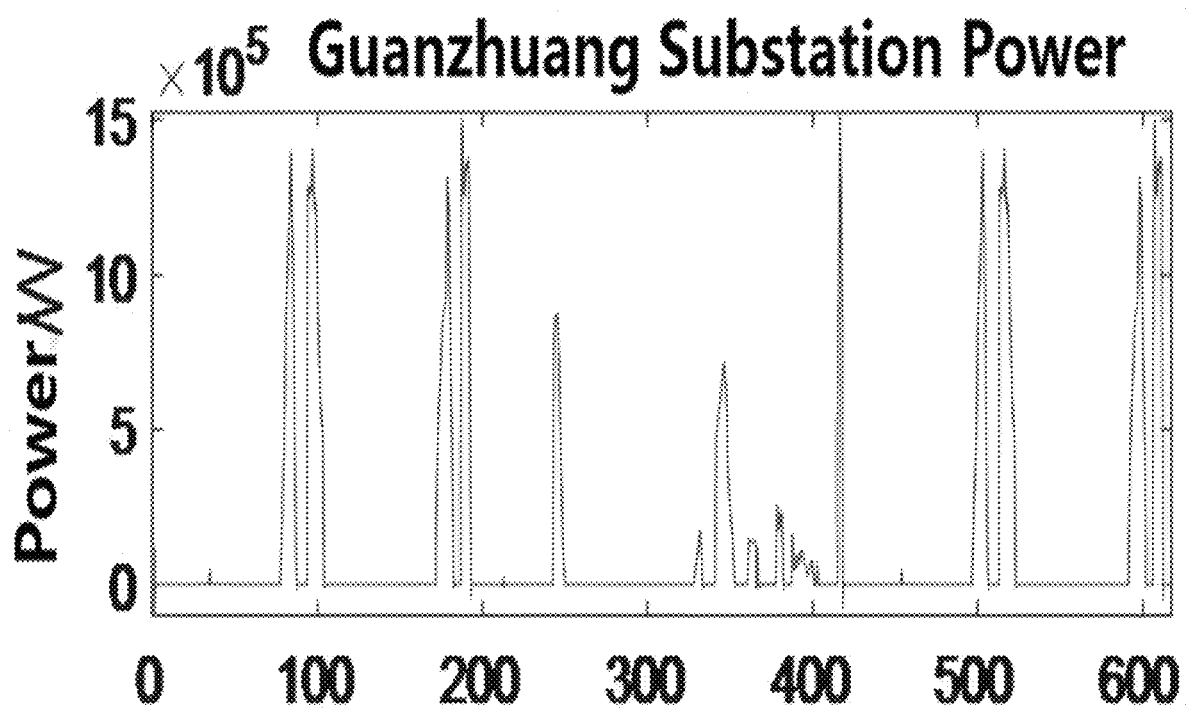
FIG. 3 is the schematic diagram of the output power curve of Guanzhuang substation provided by the embodiment of the invention.
Figure 4:
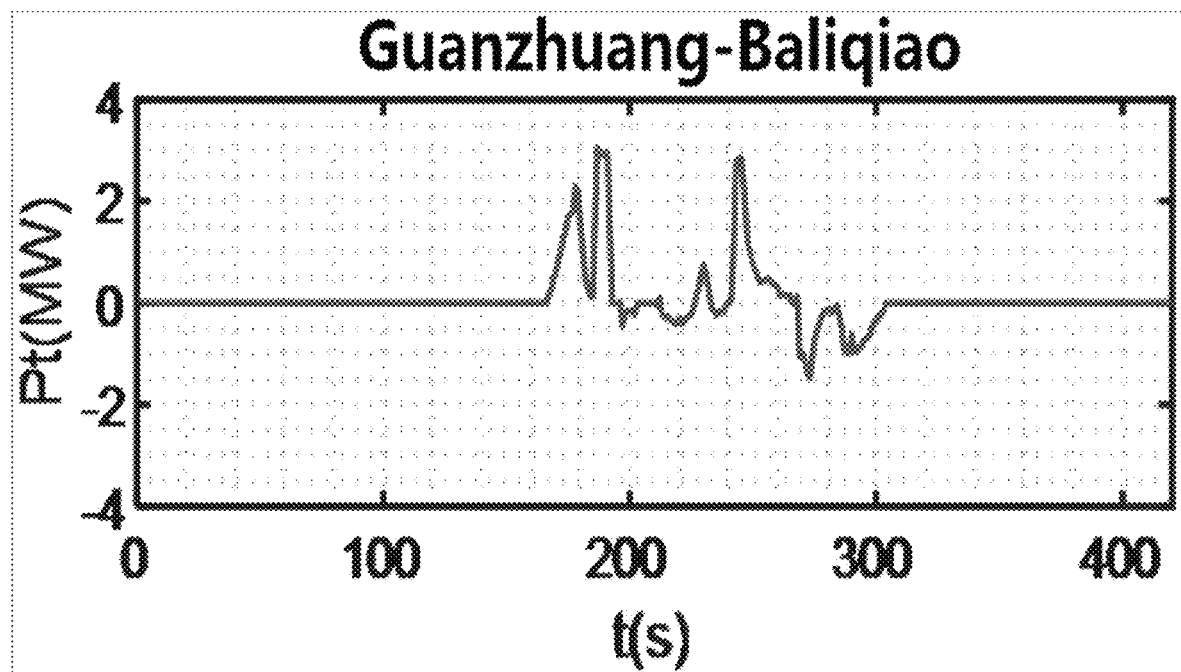
FIG. 4 is the schematic diagram of the power curve of the train in the interval from Guanzhuang to Baliqiao provided by the embodiment of the invention.

As shown in FIG. 3, the voltage and current waveform of the substation can be measured in real-time by the sensors installed in the substation, and the departure features of the train can be extracted from the output power waveform of the substation. The train power curve in the interval from Guanzhuang to Baliqiao is taken as an example, FIG. 4 shows the power changes of the train in the interval at different time points. It can be seen that the train will produce a significant power peak when it is departing, and it has a significant power valley when it is braking. FIG. 3 shows the output power curve of the substation, and it can be found that it has the same change trend as the power curve of the train, that is, when the train is departing, the output power of the substation will also increase, and when the train is braking, the output power of the substation will also be reduced to zero. In FIG. 3, the ordinate is the power of Guanzhuang substation, and the unit is W (watts), the abscissa is the time t, the unit is s (seconds); and the ordinate in FIG. 4 is Pt, which represents the power of the train in the interval from Guanzhuang to Baliqiao, the unit is MW (milliwatts); the abscissa is the time t, the unit is s (seconds).

Figure 5:
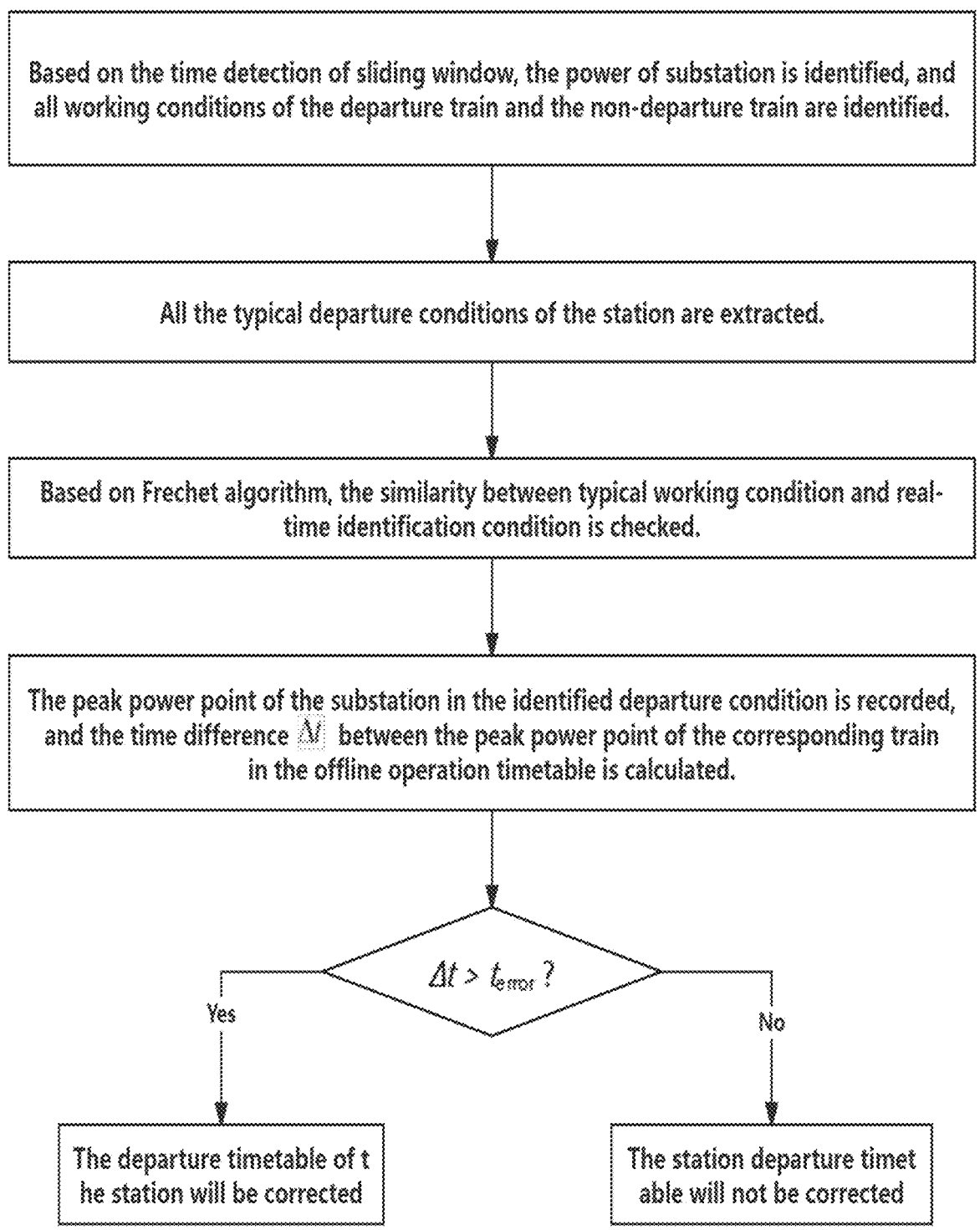
FIG. 5 is the schematic diagram of the departure timetable correction process of the train provided by the embodiment of the invention.

Therefore, by extracting the characteristics of the power curve, the accurate departure time of the train is obtained, and then the departure time of the train is corrected based on the real-time departure time, the specific process is shown in FIG. 5:

Based on the time detection of sliding window, the power of substation is identified, and all working conditions of the departure train and the non-departure train are identified.

All the typical departure conditions of the station are extracted.

Based on Frechet algorithm, the similarity between typical working condition and real-time identification condition is checked.

The peak power point of the substation in the identified departure condition is recorded, and the time difference $\Delta t$ between the peak power point of the corresponding train in the offline operation timetable is calculated.

The time difference $\Delta t$ is determined whether it is greater than the threshold, if so, the departure timetable of the station will be corrected; if not, the station departure timetable will not be corrected. It should be noted that the departure timetable of correcting the station is delaying the departure time of the station according to the time difference $\Delta t$.

2. Real-time decision based on deep reinforcement learning:

according to the central-level parameters, the electrical parameter central-level instruction values of all energy storage devices of the energy storage system at the next moment are determined, comprising:

the central-level parameters are input into the trained instruction prediction model to obtain the electrical parameter central-level instruction values of all energy storage devices of the energy storage system at the next moment, the trained instruction prediction model is a model obtained by using the sample center-level parameters as input and the sample electrical parameter center-level instruction values of all energy storage devices of the energy storage system as label.

The input of deep reinforcement learning, that is, the state quantity of reinforcement learning is: 10 kV voltages of all substations, the voltages of all substation output ends, the currents of all substation output ends, energy storage devices SOC of all energy storage systems, currents of energy storage devices, voltages of energy storage devices, offline train timetable, output instructions of all station-level controllers. The output is: voltage threshold instruction values, current instruction values or power instruction values.

Deep reinforcement learning based on DQN framework, through continuous errors and iterations, the online neural network model is optimized, in which the input is state (i.e., environment) and the output is action-value function. Its selection strategy of action uses a $\varepsilon$-greedy strategy, that is, the action of the largest action-value function is selected by a certain probability $\varepsilon$, and other strategies are randomly selected by a probability $1-\varepsilon$, the parameters in the network are updated by the gradient descent method, through continuous circulation, the action corresponding to the final maximum action-value function can be the optimal action.

Figure 6:
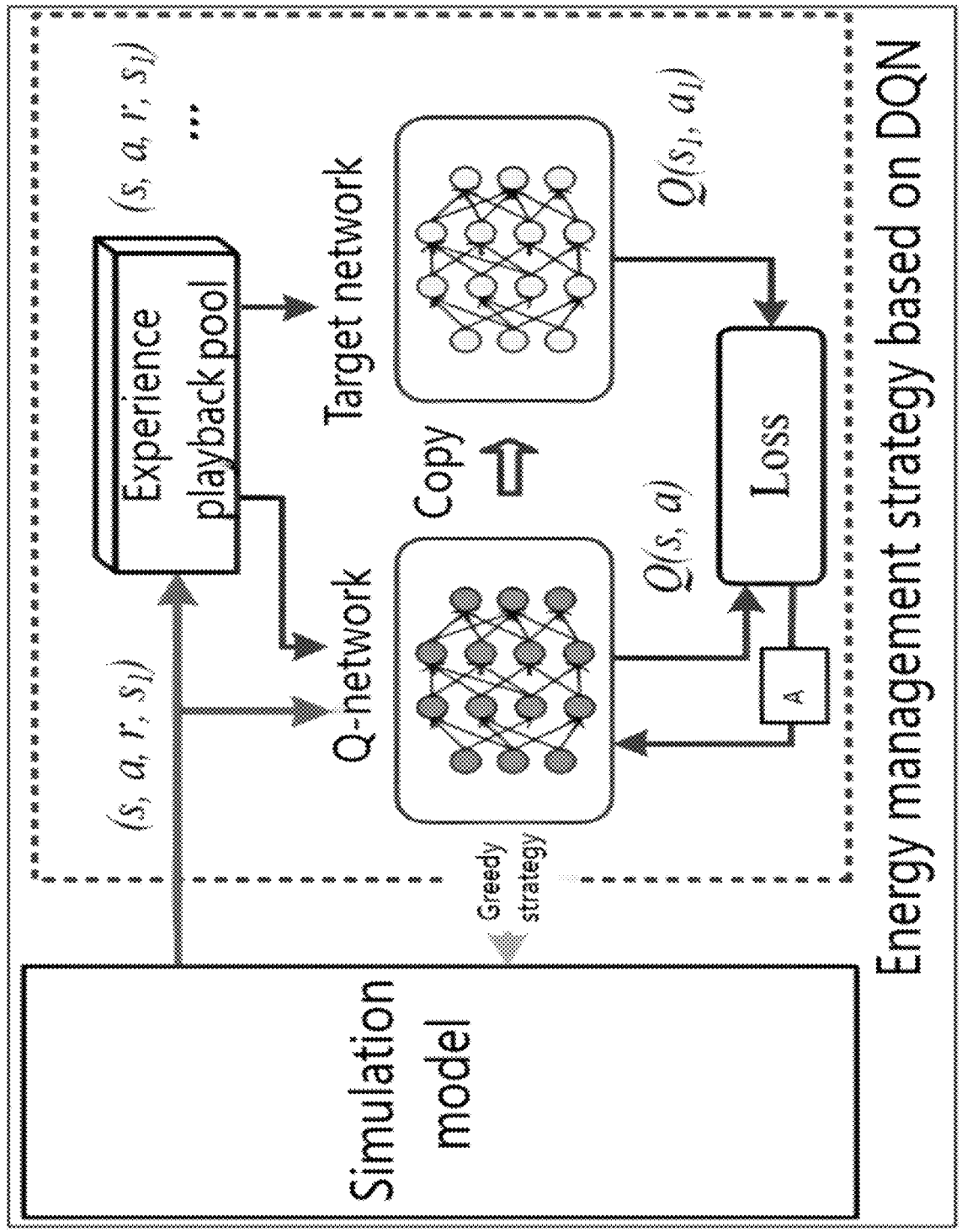
FIG. 6 is the cooperation schematic diagram of the deep reinforcement learning model and the experience playback model provided by the embodiment of the invention.

As shown in FIG. 6, the experience playback module and the deep reinforcement learning module are used in combination, the action-value function Q is approximated by an artificial neural network, the Q network is trained by a gradient descent algorithm, the network parameters are updated by the algorithm minimizing the root mean square error of the target network and the Q network, as shown below. N is the small batch data size used to perform the gradient descent algorithm, $\theta^-$ is the weight of the target network. In order to break the correlation between training data and improve the stability of the algorithm, the empirical data tuples are stored in the experience playback pool, and the data are randomly sampled during training. The A at the gradient update in FIG. 6 represents $\partial L/\partial l$.

$$L(\omega) = \frac{1}{N}\sum_{k=1}^{N}\left[r_k + \gamma\max_{a_k'}Q(s_k', a_k', \theta^-) - Q(s_k, a_k, \theta)\right]^2 \quad (1)$$

Wherein the reinforcement learning agent of the inexperience playback module discards the incoming data immediately after an update, resulting in a waste of training data, and the correlation between the two trainings becomes stronger, which has been proved to be harmful in practical applications. The experience playback module is a database that stores multiple experience data tuples, an experience data tuple is a complete training data $(s_k, a_k, r_k, s_{k+1})$, which are the current state, the optimal action in the current state, the reward of the current state, and the next state respectively.

The action-value function Q refers to the relationship between the current action and the resulting income in the current state, the neural network is used for simulation, that is, the current state's (center and parameter) is input, the current Q (s, a) can be output, that is, the action-value function of any action in the current state is obtained.

$\theta-$ is the weight of the target network, $\theta$ is the weight of the Q network, the update method $\theta$ of and $\theta-$, and the cooperation with the experience playback module are as follows:

the experience playback pool B is initialized, and the Q network based on random weights is initialized;
the target network Q is initialized based on zero weight $\theta-$;
repeated (for each fragment):
the operating state's of the simulation model based on energy interconnection is initialized;
repeated (for each fragment):

under the state s, the action a is selected according to the ε-greedy strategy;

the action a is performed in the urban rail traction power supply simulation model;

by solving the circuit equation, the system state s' and the reward signal r at the next moment are obtained.

the state transition tuples <s, a, r, s'> are stored in the experience pool B;

the small batch state transition array is conducted sampling from B;

by performing gradient descent algorithm on formula (1), the parameters of Q network are updated;

θ—←—θ is performed every n steps;

until s is the termination state;

until the algorithm termination condition is satisfied.

The above termination state is when the gradient of the gradient descent method (that is, the partial derivative) approaches 0 (set to be less than a set value, such as 0.001); or the iteration reaches the upper limit (such as 1000 times) and then terminate. It is the corresponding output for each state. The termination condition is that all steps of this fragment are completed (that is, each step satisfies the termination state).

(2) Station-Level Controller.

As shown in FIG. 1, the station-level controller is responsible for the management of the energy storage system of the station, its hardware equipment is based on DSP or ARM, and it supports heterogeneous computing and uses the combination of ARM/DSP+FPGA+GPU, which upgrades the industrial-level controller to the edge device of high-performance computing.

The main functions of the station-level controller comprise real-time judgment of working condition and power identification; statistics of energy within the minute-level; implement of the local optimal algorithm. The optimization goal of the station-level controller is to improve the minute-level energy saving rate, voltage stabilization rate and other indicators.

The information (station-level parameters) that the station-level controller needs to obtain are the 10 kV voltages of the substation and the two adjacent substations, the voltages of the substation output ends, the currents of the substation output ends, the SOC, currents and voltages of the energy storage devices of the substation and the two adjacent substations, and the output of the central-level controller. It should be noted that when there is only one adjacent substation, only the SOC, current and voltage of the energy storage device of the adjacent substation are obtained. The main output of the station-level controller is: voltage instruction values, power instruction values or current instruction values, which are used as the input of the device-level controller.

Through the algorithm of the station-level controller, the voltage threshold, power instruction values or current instruction values are output in real-time, and they are fused with the voltage threshold, power instruction values or current instruction values output by the central-level controller, and finally the executable instruction values are output as the input of the device-level controller.

The station-level controller can adopt an energy management strategy based on condition judgment; the main description of the strategy is as follows:

1. The K-means clustering algorithm is used to judge the traction and braking condition, comprising:

the ground features of the train in the interval are obtained; the ground features comprise substation voltage, current and no-load voltage.

The ground features are input into the trained K-means cluster to obtain the working condition of the train in the interval, the working condition comprise traction and braking. Specifically:

As an unsupervised algorithm, the main function of K-means clustering algorithm is to automatically divide the similar data in the data set into the same category. Therefore, K-means clustering algorithm is often applied to the independent mining of data rules. The K-means clustering algorithm measures the similarity between data samples by calculating the Euclidean distance, and the data set is divided into clusters with K mean vectors, wherein the mean vector $\mu_k$ represents the centroid of the cluster $C_k$. The expression of mean vector is as follows:

$$\mu_k = \frac{1}{|C_k|} \sum_{i \in C_k} x_i \qquad (2)$$

The quadratic sum of the distance from each sample to the cluster center in the cluster is denoted as J. The result of the K-means algorithm is to find K clustering centers through the iterative process to minimize J, and the objective function J describes the closeness of the samples in the cluster. The expression of J is as follows:

$$J = \sum_{k=1}^{K} \sum_{i \in C_k} \|x_i - \mu_k\|_2^2 \qquad (3)$$

Figure 7:
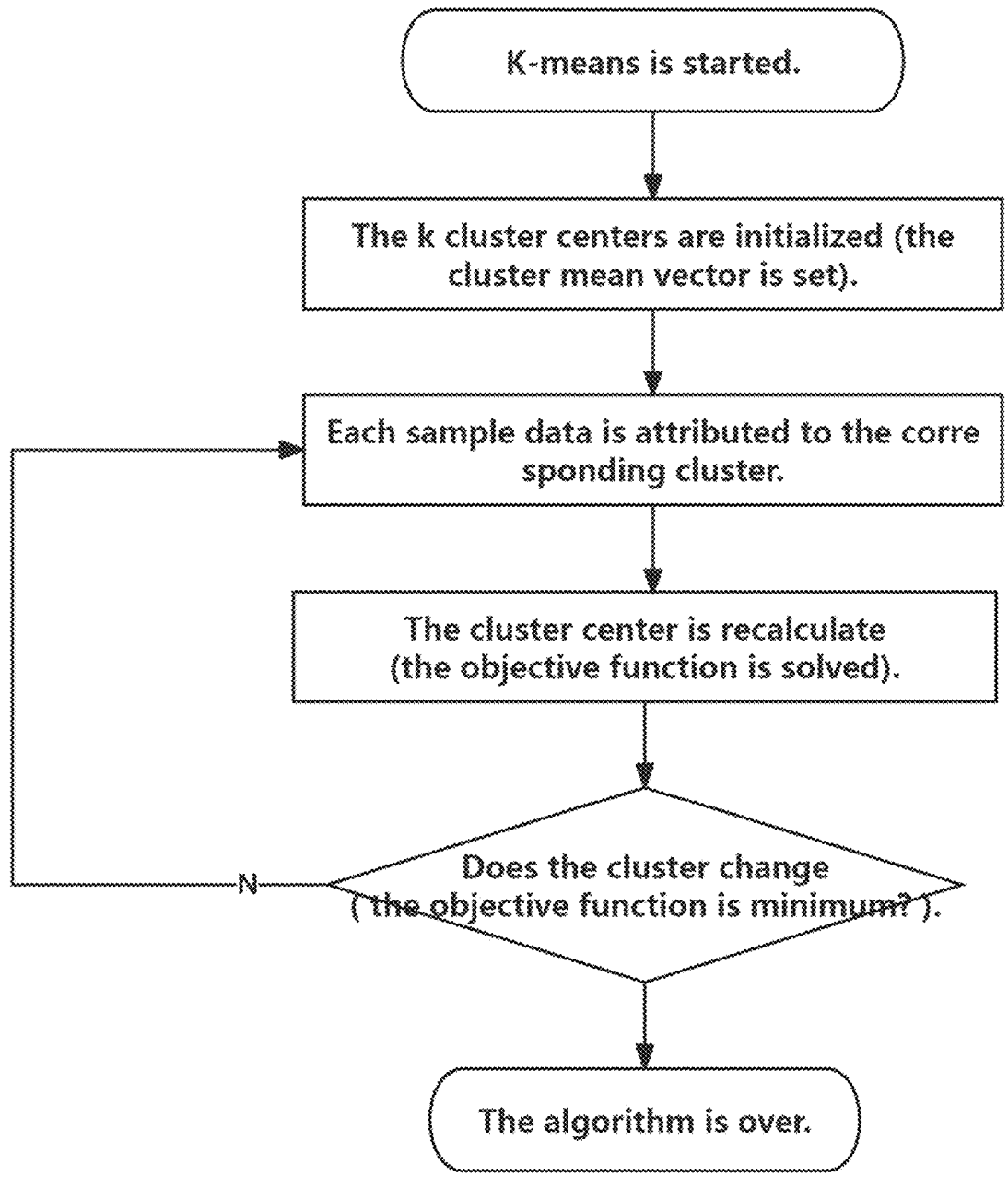
FIG. 7 is the K-means clustering algorithm flow provided by the embodiment of the invention.
Figure 8:
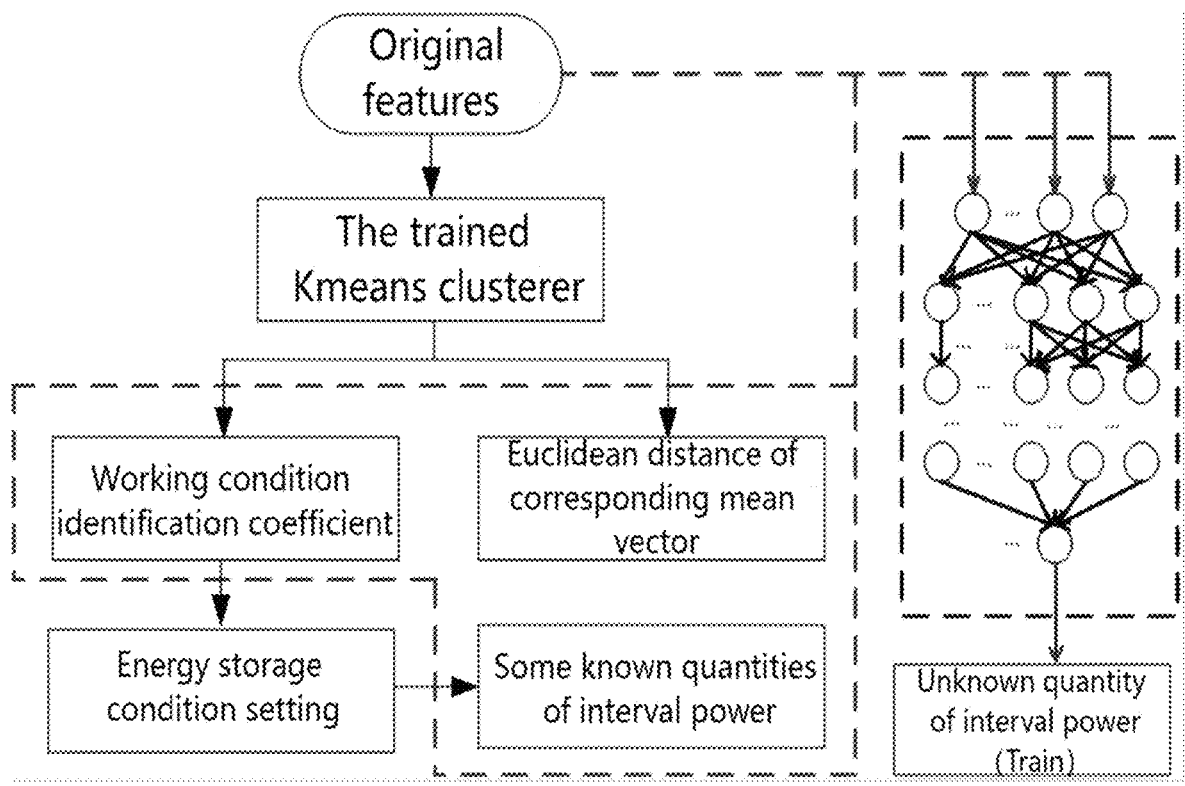
FIG. 8 is the schematic diagram of the power identification process provided by the embodiment of the invention.

Therefore, the essence of K-means clustering algorithm is a simple iterative process of numerical calculation, and the complexity of the algorithm itself is low, so the performance requirement of the processor is low. Generally, the DSP-based control system used for the control of energy storage system can perform this algorithm. The process of K-means clustering algorithm is shown in FIG. 7.

The method is divided into two stages: offline and online. In the offline stage (that is, the trained K-means clustering stage), the K-means clustering algorithm is used to conduct rule mining on the historical data, and it also used to establish the relationship model between the train working condition and the ground features. In the online stage, according to the sampling device of substation and energy storage system, the ground features such as substation voltage, current and no-load voltage are collected in real-time, and then the train working condition is identified online based on the results of offline mining.

2. Power identification based on clustering result and deep FNN:

after the ground features are input into the trained K-means cluster to obtain the working condition of the train in the interval, it also comprises:

The power identification parameters of the train in the interval are obtained; the power identification parameters comprise the no-load voltage, the output power of the substation, the change rate of the output voltage of the substation, the working condition of the train and the power of the energy storage device.

The power identification parameters are input into the trained power identification model to obtain the power of the train in the interval. The trained power identification model is a model obtained by taking the sample power identification parameters of the train in the interval as input and the sample power of the train in the interval as label.

In this embodiment, the power identification model uses the deep learning FNN model to identify and output the power curve of the interval. The input layer of the FNN model comprises five features: no-load voltage, substation output power, change rate of substation output voltage, working condition result of clustering, and energy storage device power. The hidden layer and output layer of the FNN model use the ReLU function as the activation function to enhance the nonlinear fitting ability of the model. The training of the FNN model uses the Adam optimization algorithm to improve the convergence speed and accuracy of the model. The training process of deep FNN model based on Adam optimization algorithm is shown in Table 1:

TABLE 1

The training process of deep FNN model based on Adam optimization algorithm

Input:

1) Pre-processed training set T = $\{(x_i, y_i)\}_{i=1}^n$, segmented verification set V;
2) FNN network layer number L, number of neurons, activation function;
3) 'Adam', MaxEpochs, stopping condition;

Process:

1) the network parameters w, b are initialized; Adam optimizer setting is initialized;
2) repeat;
3) the samples in the training set D are randomly rearrange;
4) for i = 1 do;
5) the sample is selected from $D^{(x_i, y_i)}$;
6) forward propagation: the input value and activation value of each layer are calculated;
7) back Propagation: layer-by-layer loss is calculated and back propagation is conducted;
8) gradient calculation: the layer-by-layer gradient value is calculated;
9) update of network parameters: the network parameters based on Adam algorithm are updated;
10) update of optimizer parameters: the momentum variables and learning rate are updated;
11) end;
12) until stopping condition/MaxEpochs is reached;

Output: the trained deep FNN model is obtained.

3. Threshold adjustment strategy based on working condition and power identification:

after the ground features are input into the trained K-means clusterr to obtain the working condition of the train in the interval, it also comprises:

The reference value of the charge and discharge voltage threshold of the energy storage system is determined according to the working condition of the train in the interval and the traction network voltage at the current moment.

When the working condition of the train in the interval is braking, the charge threshold instruction values of the energy storage system are calculated according to the reference value of the charge and discharge voltage threshold and the braking power of the train in the interval.

When the working condition of the train in the interval is traction, the discharge threshold instruction values of the energy storage system are calculated according to the reference value of the charge and discharge voltage threshold and the traction power of the train in the interval.

The process of calculating the electrical parameter initial instruction values of each energy storage device at the next moment according to the station-level parameters is as follows:

It should be noted that the electrical parameter initial instruction values in this embodiment comprise the charge threshold instruction values $U_{ch}$ and the discharge threshold instruction values $U_{dis}$.

Specifically: based on the working condition recognition algorithm, the traction and braking are obtained, the working condition mark is M, when the train is in the traction, M=−1, when the train is in the braking, M=1. According to the output of working condition coefficient M and the current traction network voltage $U_{actual}$, the reference value $U_{ref}$ of the charge and discharge voltage threshold of the energy storage system is adjusted. $\Delta U_{ref}$ is the adjustment of each reference value, which can be flexibly adjusted according to the actual engineering needs.

$$U_{ref} = U_{actual} - M \cdot \Delta U_{ref} \quad (4)$$

The reference value $U_{ref}$ of the charge and discharge threshold is calculated by the above formula. Then, the charge and discharge voltage threshold of the energy storage system is calculated according to formula (5), so as to realize the dynamic adjustment of the threshold. In the formula, $k_b$ is the adjustment ratio of the charge voltage threshold, and $k_t$ is the adjustment ratio of the discharge voltage threshold, which can be adjusted according to the actual situation. $P_b$ is the residual braking power identified by the above power identification model, and $P_t$ is the residual traction power identified by the above power identification model. $U_{ch}$ is the charge threshold instruction values, $U_{dis}$ is the discharge threshold instruction values, $U_{noload}$ is the no-load voltage, and $U_{br}$ is the starting voltage of the train's braking resistor. At the same time, in order to avoid the substation itself charging the energy storage system due to the low charge threshold, and the discharge threshold is too high when the energy storage system discharges, which causes the network voltage to rise rapidly and causes the braking resistor on the train to start, the adjustment range of the reference value is set a limit.

$$\begin{cases} U_{ch} = U_{ref} - k_b P_b \\ U_{dis} = U_{ref} - k_t P_t \end{cases}; \begin{cases} U_{noload} = U_{ch} \\ U_{dis} = U_{br} \end{cases}; \quad (5)$$

Figure 9:
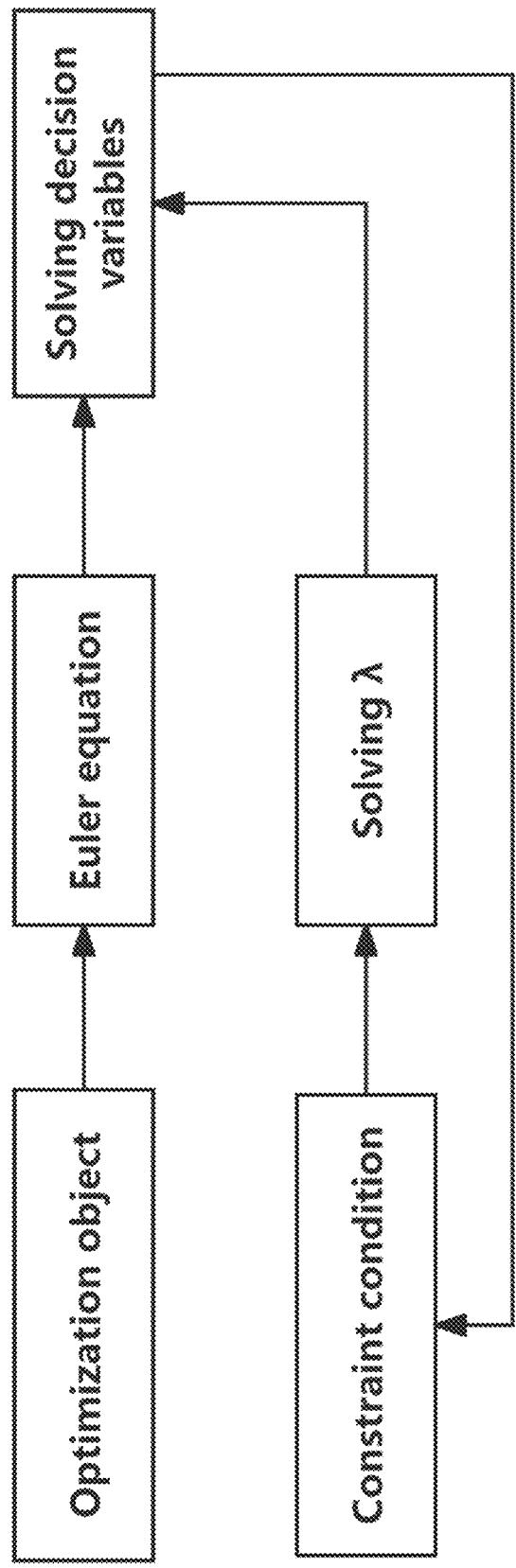
FIG. 9 is the schematic diagram of the solution process of the variational method provided by the embodiment of the invention.

The embodiment also uses the prediction information of the power, energy and position of the train provided by the central-level controller to locally optimize the discharge threshold $U_{dis}$ of the energy storage device. The optimization problem is solved by the variational method. Specifically, the discharge threshold of the energy storage device is used as the variational function to construct a functional, so that the extreme value of the functional can be obtained under the variational function. The solving process of the variational method is shown in FIG. 9.

According to the electrical parameter initial instruction values of each energy storage device at the next moment and the electrical parameter center-level instruction values, the electrical parameter station-level instruction values of the energy storage device at the next moment are determined, that is, the weighted fusion of the threshold of the station-level controller and the threshold of the center-level controller, the fusion formula is as follows:

$$\begin{cases} U_{ch-final} = k_{fc} U_{ch-local} + (1 - k_{fc}) U_{ch-cen} \\ U_{dis-final} = k_{fd} U_{dis-local} + (1 - k_{fd}) U_{dis-cen} \end{cases} \quad (6)$$

The variation range of the fusion coefficient is 0-1, and the initial value is 1, the adjustment formula is as follows:

$$\begin{cases} k_{fc} = a_1 k_{fc} + b_1 \Delta E \\ k_{fd} = a_1 k_{fd} + b_1 \Delta E \\ 0 < a_1 < 1, 0 < b_1 < 1 \\ 0 \le k_{fc} \le 1, 0 \le k_{fd} \le 1 \end{cases} \quad (7)$$

Wherein $U_{ch}$-local, $U_{ch}$-cen and $U_{ch}$-final are the charge threshold instruction values calculated by the station-level controller, the charge threshold instruction values of the central-level controller, and the charge threshold instruction values after fusion; $U_{dis}$-local, $U_{dis}$-cen and $U_{dis}$-final are the discharge threshold instruction values calculated by the station-level controller, the discharge threshold instruction values of the central-level controller, and the discharge threshold instruction values after fusion respectively. $k_{fc}$ and $k_{fd}$ are the charge threshold fusion coefficient and the discharge threshold fusion coefficient respectively.

Wherein the electrical parameter station-level instruction values comprises $U_{ch}$-final and $U_{dis}$-final. The electrical parameter station-level instruction values comprises the charge threshold instruction values $U_{ch}$-cen and the discharge threshold instruction values $U_{dis}$-cen.

(3) Device-Level Controller.

As shown in FIG. 1, the device-level controller mainly manages the energy storage part, the converter part, the charge and discharge control part and the security logic protection part. The energy storage part can use different energy storage devices such as super capacitor, batter, and flywheel; the converter part can choose DC/DC converter or DC/AC inverter; the charge and discharge control part is realized by digital controller such as DSP, ARM, single chip microcomputer, etc; the safety logic protection part is realized by PLC.

The main functions of the device-level controller are: 1. acquisition and transmission of signal; 2.ms-level voltage, ms-level current, ms-level power, SOC control; 3.ms-level fault protection. The optimization objectives of the device-level controller are: response speed, anti-interference ability, efficiency, and ripple.

The information (device-level parameters) that the device-level controller needs to obtain comprises traction network voltage, traction network side current, energy storage device voltage, energy storage device current, energy storage device SOC, and IO signal required for safety protection.

The main purpose of the device-level controller is to output the switching pulse signal to achieve accurate control of voltage, current and power.

Figure 10:
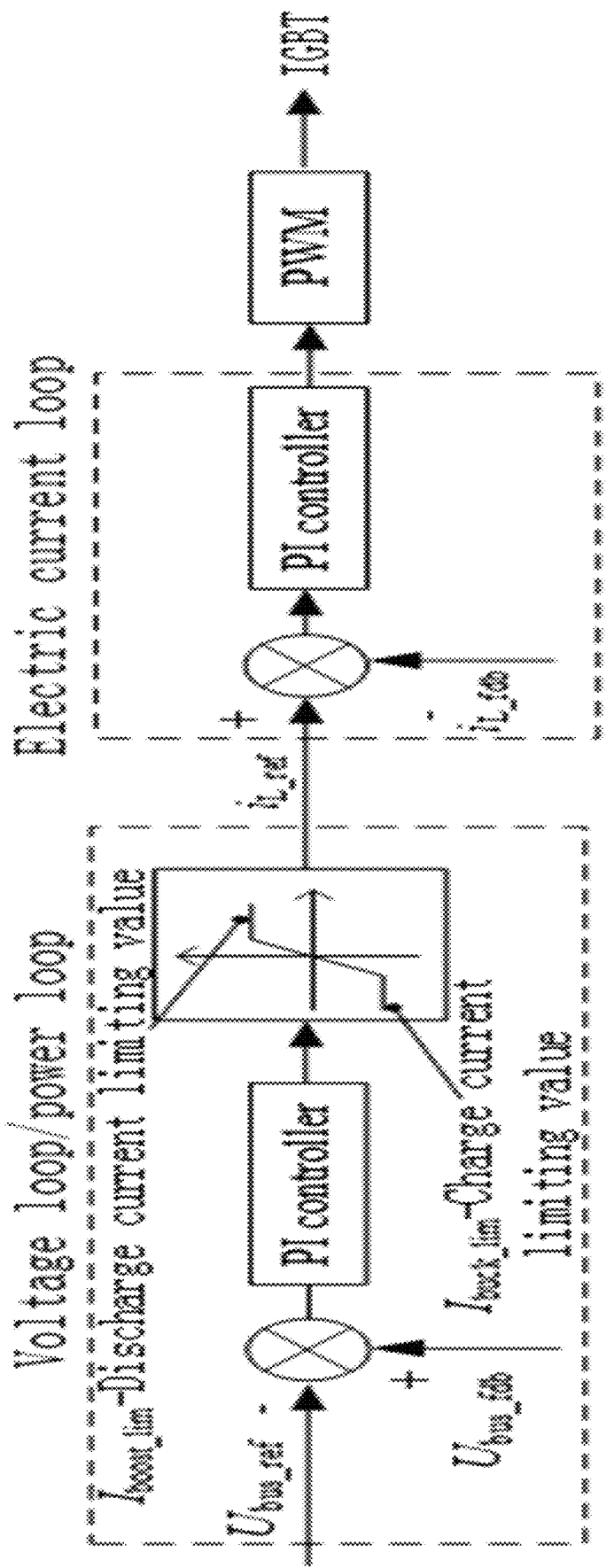
FIG. 10 is the schematic diagram of that charge and discharge controlling the outer ring/inner ring provided by the embodiment of the invention

According to the device-level parameters and the electrical parameter station-level instruction values, the traction network voltage, the energy storage device current and the energy storage device power are controlled as follows:

As shown in FIG. 10, the charge and discharge control part needs to realize the control of a variety of different physical quantities, comprising the control of traction network voltage, energy storage device current and energy storage device power, namely constant voltage control, constant current control and constant power control. The following unified dual-loop control framework can be used for control, the outer loop is the voltage loop and the inner loop is the current loop. Specifically, when in constant voltage control, the outer loop input instruction is the traction network voltage instruction, and the feedback is the actual traction network voltage, the outer loop output is the energy storage device current, and the feedback value is the actual current of the energy storage device. When in constant power control, the outer loop input instruction is the power instruction values, the feedback value is the product of the traction network voltage and the traction network side current, the outer loop output is the energy storage device current, and the feedback value is the actual energy storage device current. When in constant current control, the outer loop is saturated and the regulating effect is lost, the current limiting value is set as the instruction values of the inner loop current, and the feedback value is the actual current of the energy storage device.

In FIG. 10, $U_{bus\_ref}$ is the voltage threshold instruction values output by the station-level controller, $U_{bus\_fdb}$ is the traction network voltage signal collected by the device-level controller in real-time, $I_{boost\_lim}$ and $I_{buck\_lim}$ are the discharge and charge current limiting values sent by the station-level controller in real-time, $i_{L\_ref}$ is the current instruction values of the energy storage device output by the outer loop PI, and $i_{L\_fdb}$ is the energy storage device current collected by the device-level controller in real-time.

It should be noted that the station-level controller will output voltage threshold instruction, current instruction or power instruction based on the needs of energy management, and the device-level controller will control according to the type of the received instruction values. The device-level controller will have a finite current link, that is, when the current reaches the maximum current limiting value, it will automatically switch to the constant current control of the maximum current.

In this embodiment, the method also comprises:
if the electrical parameter station-level instruction values of the energy storage device collected by the device-level controller are greater than the set threshold, then the electrical parameter station-level instruction values of the energy storage device at the previous moment are used to replace the electrical parameter station-level instruction values of the energy storage device.

In this embodiment, the method also comprises:
If the charge threshold instruction values and the discharge threshold instruction values at the current moment are not within their respective setting ranges, the charge threshold instruction values and the discharge threshold instruction values at the previous moment are used to replace the charge threshold instruction values and the discharge threshold instruction values at the current moment respectively.

Specifically: due to the certain repetition and crossover relationship between the decision variables of the device-level controller, station-level controller, and center-level controller, the verification mechanism is set up in this embodiment, the verification mechanism is as follows:

The verification mechanism of the device-level controller: the upper and lower limits of the voltage, current and power instructions are set, if the received instruction values exceed the upper and lower limits, the instruction values are considered to be calculated incorrectly and the value at the previous moment is used.

The verification mechanism of station-level controller:

The range of charge threshold and discharge threshold is set, if it exceeds, it is discarded and the threshold at the previous moment is maintained.

In order to adapt to the application characteristics of urban rail transit energy storage system, the invention proposes a set of energy management framework based on distribution centralization. The framework consists of three layers: device-level, station-level and center-level. The invention designs and analyzes the three-layer structure in detail from the following aspects:

Main functions: the main task and responsibility of each layer are described, as well as the management scope and control objective of each layer of the energy storage system.

Required information: the information that needs to be acquired and processed in each layer is explained, as well as the source and transmission mode of information.

Optimization objective: the optimization objective of each layer is defined, as well as the quantitative indicator and constraint of the optimization objective.

Controller output: the controller output of each layer is given, as well as the form and meaning of the output.

Verification mechanism: the verification mechanism of each layer is designed to ensure the rationality and security of the controller output.

Hardware and software algorithms: the hardware devices and software algorithms of each layer are selected to meet the calculation performance and real-time requirement of the controller.

Based on this framework, this paper proposes three layers of specific control strategies, namely:

Center-level strategy: deep reinforcement learning+frechet-based train timetable prediction method is used to optimize the long-term full-range control of all energy storage systems, and it also used to output the prediction information such as power, energy and position of the train, as well as the voltage instruction values, power instruction values or current instruction values of each energy storage device.

Station-level strategy: the method based on power and energy prediction is used to optimize the short-term local-range energy storage system of the station, and it also used to output voltage instruction values, power instruction values or current instruction values, which are fused with the output of the central-level strategy.

Device-level strategy: the method based on the fixed double-layer PI control framework is used to control the energy storage device in real-time and accurately.

The invention also proposes a decision variable fusion method between different levels to coordinate the control objectives and control effects between different levels.

Each embodiment in this instruction is described in a progressive way, each embodiment focuses on the difference from other embodiments, the same similarity between each embodiment can be seen in each other.

In this paper, specific embodiments are used to explain the principle and implementation method of the invention, the above embodiments are only used to help understand the method and the core idea of the invention. At the same time, for the general technical personnel in this field, according to the idea of the invention, there will be changes in the specific implementation methods and application scope. In summary, the content of this paper should not be understood as a limitation to the invention.

What is claimed is:

1. An energy management framework for rail transit energy storage, the energy management framework comprises: a central-level controller, several station-level controllers, and several device-level controllers; wherein the central-level controller is wirelessly connected to all the station-level controllers to collect central-level parameters, and electrical parameter central-level instruction values of all energy storage devices of an energy storage system at next moment are determined according to the central-level parameters, the central-level parameters comprise a 10 kV voltage of all substations, voltages and currents of all substation output ends at the current time, an offline train timetable, a SOC, the current and voltage of all the energy storage devices at the current time, and electrical parameter station-level instruction values of each energy storage device output by the station-level controller at the previous time; the electrical parameters are voltage, power or current; according to the central-level parameters, the electrical parameter central-level instruction values of all energy storage devices of the energy storage system at the next moment are determined, comprising:

the central-level parameters are input into a trained instruction prediction model to obtain the electrical parameter central-level instruction values of all energy storage devices of the energy storage system at the next moment, the trained instruction prediction model is a model obtained by using the sample center-level parameters as input and the sample electrical parameter center-level instruction values of all energy storage devices of the energy storage system as label; the input of deep reinforcement learning, that is, the state quantity of reinforcement learning is: 10 kV voltages of all substations, the voltages of all substation output ends, the currents of all substation output ends, the energy storage devices SOC of all energy storage systems, the currents of energy storage devices, the voltages of energy storage devices, the offline train timetable, output instructions of all station-level controllers, the output is: voltage threshold instruction values, current instruction values or power instruction values;

an experience playback module and a deep reinforcement learning module are used in combination, an action-value function Q is approximated by an artificial neural network, a Q network is trained by a gradient descent algorithm, network parameters θ are updated by the algorithm minimizing a root mean square error of a target network and the Q network, as follows:

$$L(\omega) = \frac{1}{N}\sum_{k=1}^{N}\left[r_k + \gamma \max_{a_k'} Q(s_k', a_k', \theta^-) - Q(s_k, a_k, \theta)\right]^2$$

wherein N is a small batch data size used to perform the gradient descent algorithm, $\theta^-$ is a weight of a target network; $s_k$ is a current state, $a_k$ is an optimal action in the current state, and $r_k$ is a reward of the current state; the process of calculating the electrical parameter initial instruction values of each energy storage device at the next moment according to the station-level parameters are as follows:

the electrical parameter initial instruction values comprise charge threshold instruction values $U_{ch}$ and discharge threshold instruction values $U_{dis}$;

$$\begin{cases} U_{ch} = U_{ref} - k_b P_b \\ U_{dis} = U_{ref} - k_t P_t \end{cases}; \begin{cases} U_{noload} = U_{ch} \\ U_{dis} = U_{br} \end{cases};$$

$$U_{ref} = U_{actual} - M \cdot \Delta U_{ref}$$

wherein $U_{ref}$ is a reference value of charge and discharge voltage threshold; M is a working condition coefficient; $U_{actual}$ is a current traction network voltage; $\Delta U_{ref}$ is an adjustment amount of each reference value; $k_b$ is an adjustment ratio of the charge voltage threshold, and $k_t$ is the adjustment ratio of the discharge voltage threshold, $P_b$ is a residual braking power identified by the above power identification model, and $P_t$ is a residual traction power identified by the above power identification model, $U_{noload}$ is a no-load voltage, and $U_{br}$ is a starting voltage of a train's braking resistor;

according to the electrical parameter initial instruction values of each energy storage device at the next moment and the electrical parameter center-level instruction values, the electrical parameter station-level instruction values of the energy storage device at the next moment are determined, that is, the weighted fusion of the threshold of the station-level controller and the threshold of the center-level controller, the fusion formula is as follows:

$$\begin{cases} U_{ch-final} = k_{fc} U_{ch-local} + (1 - k_{fc}) U_{ch-cen} \\ U_{dis-final} = k_{fd} U_{dis-local} + (1 - k_{fd}) U_{dis-cen} \end{cases}$$

the variation range of the fusion coefficient is 0-1, and the initial value is 1, the adjustment formula is as follows:

$$\begin{cases} k_{fc} = a_1 k_{fc} + b_1 \Delta E \\ k_{fd} = a_1 k_{fd} + b_1 \Delta E \\ 0 < a_1 < 1, \ 0 < b_1 < 1 \\ 0 \le k_{fc} \le 1, \ 0 \le k_{fd} \le 1 \end{cases}$$

wherein the electrical parameter station-level instruction values comprise the charge threshold instruction values $U_{ch-cen}$ and the discharge threshold instruction values $U_{dis-cen}$; $U_{ch-local}$, $U_{ch-cen}$ and $U_{ch-final}$ are the charge threshold instruction values calculated by the station-level controller, the charge threshold instruction values of the central-level controller, and the charge threshold instruction values after fusion; $U_{dis}$-local, $U_{dis}$-cen and $U_{dis}$-final are the discharge threshold instruction values calculated by the station-level controller, the discharge threshold instruction values of the central-level controller, and the discharge threshold instruction values after fusion respectively; $k_{fc}$ and $k_{fd}$ are charge threshold fusion coefficient and discharge threshold fusion coefficient respectively; the device-level controller is used to collect device-level parameters, a traction network voltage, a energy storage device current and a energy storage device power are controlled according to the device-level parameters and the electrical parameter station-level instruction values, so that the traction network voltage, the energy storage device current and the energy storage device power can reach their respective instruction values; the device-level parameters comprise the traction network voltage, a traction network side current, the energy storage device current and the energy storage device SOC at the current moment; if the electrical parameter station-level instruction values of the energy storage device collected by the device-level controller are greater than the set threshold, then the electrical parameter station-level instruction values of the energy storage device at the previous moment are used to replace the electrical parameter station-level instruction values of the energy storage device;

if the charge threshold instruction values and the discharge threshold instruction values at the current moment are not within their respective setting ranges, the charge threshold instruction values and the discharge threshold instruction values at the previous moment are used to replace the charge threshold instruction values and the discharge threshold instruction values at the current moment respectively.

2. An energy management method for energy management framework according to claim 1, the method comprises: the central-level controller is used to collect central-level parameters, and electrical parameter central-level instruction values of energy storage devices of all energy storage system at next moment are determined according to the central-level parameters; the central-level parameters comprise 10 kV voltages of all substations, the voltages and currents of all substation output ends at the current time, the offline train timetable, the SOC, the currents and the voltages of all the energy storage devices at the current time, and electrical parameter station-level instruction values of each energy storage device output by the station-level controller at the previous time; the electrical parameters are voltage, power or current; for each station-level controller, the station-level controller is used to collect the station-level parameters, and according to the station-level parameters, the electrical parameter initial instruction values of each energy storage device at the next moment are calculated, according to the initial instruction values and the electrical parameter central-level instruction values of each energy storage device at the next moment, the electrical parameter station-level instruction values of the energy storage device at the next moment are determined, the station-level parameters comprise 10 kV voltages of the current substation and adjacent substations; the voltages and currents of all substations output ends at the current time; the SOC, the current and voltage of the energy storage device of the current substation; the SOC, the currents and voltages of the energy storage device of the adjacent substations; the electrical parameter initial instruction values of each energy storage device and the information of the train at the current time; the device-level controller is used to collect device-level parameters, the traction network voltage, the energy storage device current and the energy storage device power are controlled according to the device-level parameters and the electrical parameter station-level instruction values, so that the traction network voltage, the energy storage device current and the energy storage device power can reach their respective instruction values; the device-level parameters comprise the traction network voltage, the traction network side current, the energy storage device current and the energy storage device SOC at the current moment.

3. The energy management method according to claim 2, the train information comprises a real-time working condition of the train, the method also comprises:

ground features of the train in an interval are obtained; the ground features comprise voltages, currents and no-load voltages of substations; the train in the interval is the train between two substations; the ground features are input into the trained K-means cluster to obtain the real-time working condition of the train in the interval; the working condition comprise traction and braking.

4. The energy management method according to claim 3, the train information comprises a train power, after the real-time working condition of the train in the interval is obtained, the method also comprises: power identification parameters of the train in the interval are obtained; the power identification parameters comprise a no-load voltage, an output power of the substation, a change rate of a output voltage of the substation, the real-time working condition of the train and the power of a energy storage device; the power identification parameters are input into a trained power identification model to obtain the train power in the interval; the trained power identification model is a model obtained by taking sample power identification parameters of the train in the interval as input and a sample power of the train in the interval as label.

5. The energy management method according to claim 3, after the real-time working condition of the train in the interval is obtained, it also comprises: the reference value of the charge and discharge voltage threshold of the energy storage system is determined according to the real-time working condition of the train in the interval and the traction network voltage at the current moment; when the real-time working condition of the train in the interval is braking, charge threshold instruction values of a energy storage system are calculated according to a reference value of charge and discharge voltage threshold and a braking power of the train in the interval; when the real-time working condition of the train in the interval is traction, the discharge threshold instruction values of the energy storage system are calculated according to the reference value of the charge and discharge voltage threshold and a traction power of the train in the interval.

6. The energy management method according to claim 3, after the real-time working condition of the train in the interval is obtained, it also comprises: a typical working condition of the train in the interval of the substations at the current time; the typical working condition is determined by using an offline operation timetable; a time difference is calculated according to a time corresponding to a peak power point of the substation in the real-time working condition and the time corresponding to the peak power point of the corresponding train in the offline operation timetable; the time difference is determined whether it is greater than the set threshold, if so, a departure timetable of the substations will be corrected; if not, the departure timetable of substations will not be corrected.

7. The energy management method according to claim 2, the energy storage device comprises a super capacitor, a battery and a flywheel.

\* \* \* \* \*